United States Patent
Araki et al.

(10) Patent No.: US 7,579,784 B2
(45) Date of Patent: Aug. 25, 2009

(54) SWITCHING POWER SUPPLY AND ITS CONTROL CIRCUIT, AND ELECTRONIC APPARATUS EMPLOYING SUCH SWITCHING POWER SUPPLY

(75) Inventors: Kyoichiro Araki, Kyoto (JP); Yoichi Tamegai, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 11/792,260

(22) PCT Filed: Dec. 2, 2005

(86) PCT No.: PCT/JP2005/022156

§ 371 (c)(1), (2), (4) Date: Jun. 4, 2007

(87) PCT Pub. No.: WO2006/059705

PCT Pub. Date: Jun. 8, 2006

(65) Prior Publication Data

US 2008/0136341 A1 Jun. 12, 2008

(30) Foreign Application Priority Data

Dec. 3, 2004 (JP) .............................. 2004-352029

(51) Int. Cl.
*H05B 37/00* (2006.01)
(52) U.S. Cl. .................. 315/209 R; 323/234; 323/238; 315/254; 315/276
(58) Field of Classification Search ............. 315/209 R, 315/362, 254, 276, 284, 286
See application file for complete search history.

(56) References Cited

U.S. PATENT DOCUMENTS 7,023,187 B2 * 4/2006 Shearon et al. ............. 323/266
7,301,312 B2 * 11/2007 Nishino ...................... 323/222

FOREIGN PATENT DOCUMENTS

| JP | 1-97166 | 4/1989 |
|----|---------|--------|
| JP | 2003-216249 | 7/2003 |
| JP | 2003-324939 | 11/2003 |
| JP | 2003-333833 | 11/2003 |
| JP | 2004-297985 | 10/2004 |

OTHER PUBLICATIONS

Chinese Office Action for Chinese Patent Application 200580040900.8 dated Apr. 18, 2008 with English Translation.
Written Opinion of the International Searching Authority for International Application No. PCT/JP2005/022156 with English translation.
International Search Report for International Application No. PCT/JP2005/022156 mailed Jan. 24, 2006 with English translation.

* cited by examiner

*Primary Examiner*—Douglas W Owens
*Assistant Examiner*—Jianzi Chen
(74) *Attorney, Agent, or Firm*—Cantor Colburn LLP (57) ABSTRACT

A control circuit for controlling a switching element in a switching power supply by generating a switching signal is disclosed. The control circuit may include a soft start circuit that generates a switching signal so that an output voltage of the switching power supply gradually increases for a period until the output voltage reaches a predetermined reference voltage. The soft start circuit may increase the output voltage at a first limiting speed when the output voltage is lower than a predetermined threshold voltage, and may increase the output voltage at a second limiting speed which is set higher than the first limiting speed when the output voltage is higher than the threshold voltage.

9 Claims, 5 Drawing Sheets

FIG.5

SWITCHING POWER SUPPLY AND ITS CONTROL CIRCUIT, AND ELECTRONIC APPARATUS EMPLOYING SUCH SWITCHING POWER SUPPLY

CROSS REFERENCE TO RELATED APPLICATIONS

This is a U.S. national stage of application No. PCT/JP2005/022156, filed on 02 Dec. 2005. Priority under 35 U.S.C. §119(a) and 35 U.S.C. §365(b) is claimed from Japanese Application No. 2004-352029, filed 03 Dec. 2004, the disclosure of which is also incorporated herein by reference.

BACKGROUND OF THE INVENTION

1. Field of the Invention

The present invention relates to a switching power supply and, more particularly, to a soft start technique for gradually increasing output voltage of the switching power supply.

2. Description of the Related Art

A boosting-type switching power supply for generating a voltage higher than an input voltage is widely used in various electronic devices. The boosting-type switching power supply has a switching element and an inductor or a transformer. By turning on/off the switching element in discrete time, back electromotive force is generated in the inductor or the transformer to increase the input voltage, and the increased input voltage is output.

In such a switching power supply, to eliminate high frequency components in the boosted voltage and thereby smoothing the boosted voltage, an output capacitor is provided. At the time of starting the switching power supply, the output voltage has to be increased from 0V to a predetermined boosted voltage. In the case of abruptly increasing the output voltage, inrush current may be generated or output voltage may become too high due to overshooting or ringing of the output voltage and thereby influencing the reliability of elements constructing the circuit.

Therefore, conventionally, to prevent generation of the inrush current, a method of providing a control circuit of the switching power supply with a soft start circuit and gradually increasing the output voltage is used (Patent Document 1).
[Patent Document 1] Japanese Unexamined Patent Application Publication No. 2003-216249

However, with the conventional soft start means described in Patent Document 1, the output voltage is increased at predetermined gradient. There has been a problem when a load requiring a very high voltage of about hundreds V is connected to an output terminal of the switching power supply, time required to reach a desired voltage is long.

SUMMARY OF THE INVENTION

The present invention has been achieved in view of the problems and a general purpose of the invention is to provide a switching power supply realizing shortened starting time and a control circuit of the switching power supply.

An embodiment of the present invention relates to a control circuit of a switching power supply. The control circuit is for controlling a switching element in a switching power supply by generating a switching signal, having a soft start circuit for generating a switching signal so that an output voltage of the switching power supply is gradually increased for a period until the output voltage reaches a predetermined reference voltage. The soft start circuit increases the output voltage at a first limiting speed when the output voltage is lower than a predetermined threshold voltage, and increases the output voltage at a second limiting speed, which is set higher than the first limiting speed, when the output voltage is higher than the threshold voltage.

In the embodiment, the output voltage is increased to the predetermined threshold voltage at the first limiting speed and, after that, the increase speed of the output voltage is changed to the second limiting speed to increase the output voltage rapidly. In such a manner, the starting time of the switching power supply can be shortened.

The predetermined threshold voltage may be set in a range in which inrush current is not generated at the time of increasing the output voltage at the second limiting speed.

By setting the predetermined threshold voltage, at which the increase speed of the output voltage in the soft start is switched, to the voltage range in which inrush current is not generated, generation of inrush current can be prevented at the second limiting speed at which the output voltage is rapidly increased.

The soft start circuit may include: a charge capacitor whose one end is grounded; a current source connected to the other end of the charge capacitor to supply constant current to the charge capacitor; and a voltage comparator for comparing the output voltage with the threshold voltage. The value of current supplied from the current source may be changed according to the first and second limiting speeds, that is, according to an output signal of the voltage comparator, and the output voltage may be increased based on a voltage appearing at the charge capacitor.

Since the voltage appearing at the charge capacitor is given by a value obtained by time-integrating constant current supplied from the current source, by changing the current value of the constant current, the rising speed of the output voltage can be controlled.

The soft start circuit may further include a bias circuit which becomes active for a predetermined period after the output voltage becomes lower than a predetermined second threshold voltage and keeps a voltage appearing at the charge capacitor to a predetermined voltage value. The second threshold voltage may have the same voltage value as the above-described threshold voltage.

The bias circuit may include: a transistor connected in parallel with the charge capacitor; and a bias current source for supplying predetermined bias current to the transistor. The transistor may be turned on for a predetermined period after the output voltage becomes lower than the second threshold voltage.

By turning on the transistor when the output voltage is lower than the second threshold voltage, charge in the charge capacitor is discharged, and thus the voltage appearing at the charge capacitor drops and is biased to a predetermined voltage value. As a result, not only at the start of the switching power supply but also in the case where the output voltage drops due to fluctuations in a load or the like, the output voltage can be increased again by the soft start.

The control circuit may be integrated on a single semiconductor substrate. "Integration" includes the case where all of components of the circuit are formed on a single semiconductor substrate and the case where main components of the circuit are integrated and a part of resistors, capacitors, and the like provided for adjusting the circuit constant may be formed on the outside of the semiconductor substrate. By integrating the control circuit as one LSI, the circuit area can be reduced.

Another embodiment of the present invention relates to a switching power supply. The switching power supply includes: the above-described control circuit; a switching element controlled by the control circuit; and an output circuit for stepping up/down an input voltage by turning on/off the switching element.

In the embodiment, the output voltage is increased to the predetermined threshold voltage at the first limiting speed and, after that, the increase speed of the output voltage is changed to the second limiting speed to increase the output voltage rapidly. In such a manner, the starting time of the switching power supply can be shortened.

Still another embodiment of the invention relates to an electronic device. The electronic device includes: an image pickup unit; a light emitting element which emits light as a flash at the time of imaging operation of the image pickup unit; and the above-described switching power supply for increasing voltage of a battery and supplying a drive voltage to the light emitting element.

In the embodiment, time for generating a sufficiently high voltage for driving the light emitting element can be shortened.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
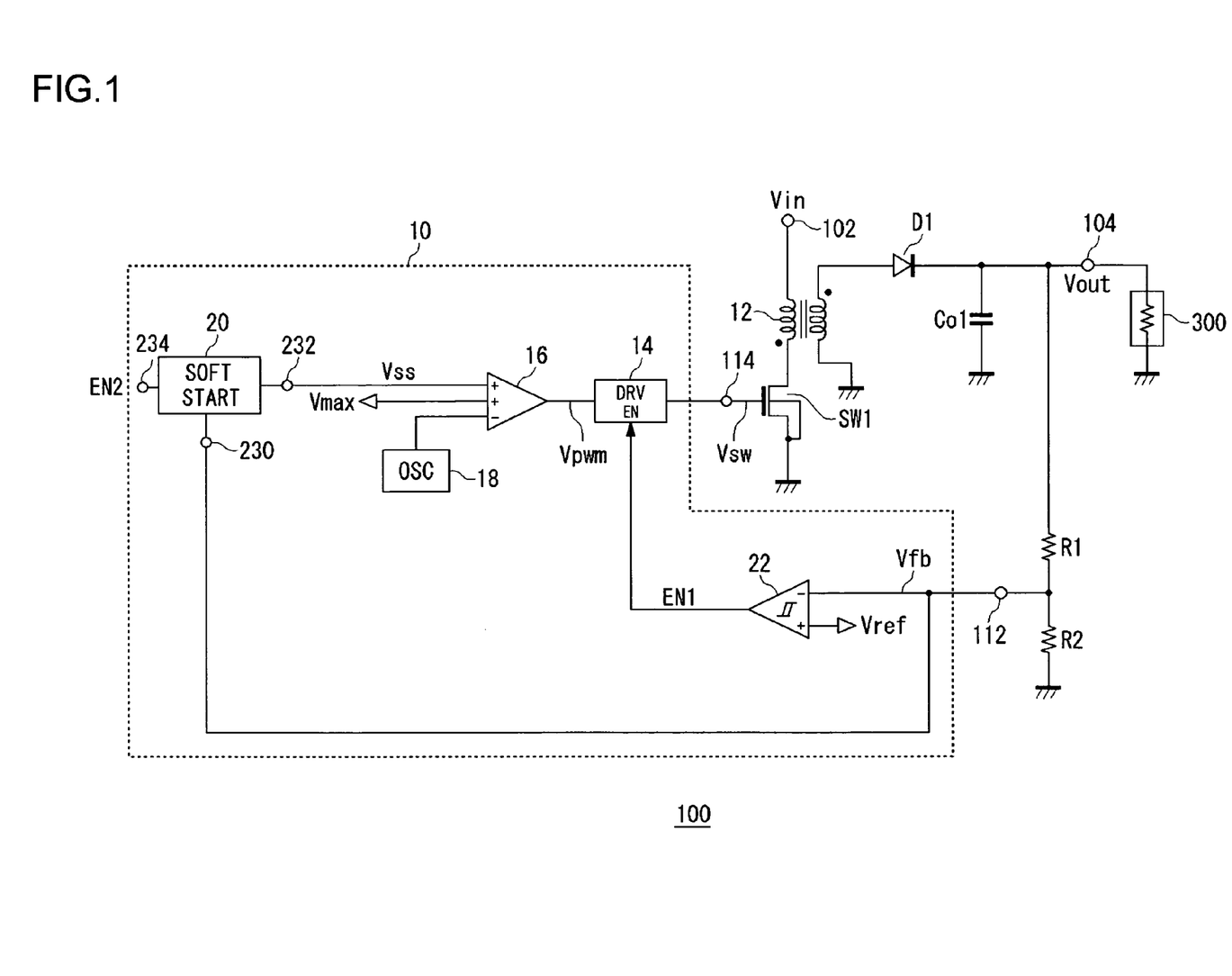
FIG. 1 is a circuit diagram showing a configuration of a switching power supply according to an embodiment of the invention.

FIG. 1 is a circuit diagram showing a configuration of a switching power supply 100 of an embodiment. The switching power supply 100 is a boosting-type switching power supply for increasing an input voltage $V_{in}$ supplied to an input terminal 102 and outputting the boosted voltage from an output terminal 104. To the switching power supply, a load circuit 300 requiring an output voltage of about 300V such as a Xenon lamp is connected.

The switching power supply 100 is a flyback switching regulator and includes a control circuit 10, a switching element SW1, a transformer 12, a rectifier diode D1, and an output capacitor Co1.

The switching element SW1 is a MOS transistor and a gate voltage thereof is controlled by a switching signal $V_{sw}$ output from the control circuit 10, thereby controlling the on/off state of the switching element SW1.

The primary side of the transformer 12 is connected between the switching element SW1 and the input terminal 102. One end of the secondary side of the transformer 12 is grounded and the other end is connected to the output terminal 104 via the rectifier diode D1.

The output capacitor Co1 is provided between the output terminal 104 and the ground potential. The output capacitor Co1 smoothes output voltage $V_{out}$ output from the output terminal 104.

The switching element SW1 is intermittently switched on/off by the switching signal $V_{sw}$ output from the control circuit 10. In the on state, current flows to the primary side of the transformer 12 from the input terminal 102 via the switching element SW1. In the off state, energy is transferred to the secondary side of the transformer 12. As a result, the input voltage $V_{in}$ applied to the input terminal 102 is boosted, and the load circuit 300 connected to the output terminal 104 is driven with the output voltage $V_{out}$.

The control circuit 10 monitors the output voltage $V_{out}$ output from the output terminal 104 and generates the switching signal $V_{sw}$ so as to obtain a predetermined voltage.

The control circuit 10 has, as signal input/output terminals, a feedback terminal 112 for monitoring the output voltage $V_{out}$ and a switching terminal 114 for outputting the generated switching signal $V_{sw}$.

The control circuit 10 includes a hysteresis comparator 22, a driver circuit 14, a first comparator 16, an oscillator 18, and a soft start circuit 20.

The output voltage $V_{out}$ appearing at the output terminal 104 is divided by a first resistor R1 and a second resistor R2, and the resultant voltage is fed back as a feedback voltage $V_{fb}$ to the feedback terminal 112 of the control circuit 10. The feedback voltage $V_{fb}$ input to the feedback terminal 112 is input to the hysteresis comparator 22.

The hysteresis comparator 22 is a voltage comparator whose threshold voltage changes at a leading edge and a trailing edge of a signal, and can be configured with a normal voltage comparator provided with positive feedback. A reference voltage $V_{ref}$ is input to a non-inverting input terminal of the hysteresis comparator 22, and the feedback voltage $V_{fb}$ is input to an inverting input terminal. The hysteresis comparator 22 has hysteresis such that while the feedback voltage $V_{fb}$ input to the non-inverting input terminal is rising, a voltage value to be compared with is set to $V_{ref}1$. While the feedback voltage $V_{fb}$ is falling, the voltage value to be compared with is set to $V_{ref}2$.

The hysteresis comparator 22 outputs a first enable signal EN1 based on a result of comparison between the comparison voltage $V_{ref}$ so as to be of high level when $V_{ref}>V_{fb}$ and be of low level when $V_{ref}<V_{fb}$. The first enable signal EN1 output from the hysteresis comparator 22 is input to an enable terminal EN of the driver circuit 14.

The first comparator 16 has three input terminals, and generates a pulse-shaped PWM (Pulse-Width Modulation) signal $V_{pwm}$ based on the comparison result of voltages of two positive terminals + and one negative terminal −.

To the positive terminals +, maximum voltage $V_{max}$ determining the maximum duty ratio and a soft start voltage $V_{ss}$ output from the soft start circuit 20 are input. To the negative terminal −, an oscillation signal $V_{osc}$ output from the oscillator 18 is input. The oscillation signal $V_{osc}$ output from the oscillator 18 is a periodic signal of triangular or saw-toothed shape.

The first comparator 16 compares a voltage $V_x$, which is smaller one of the soft start voltage $V_{ss}$ and the maximum voltage $V_{max}$, with the oscillation signal $V_{osc}$ and outputs a high-level signal when $V_x > V_{osc}$, and outputs a low-level signal when $V_x < V_{osc}$. The soft start voltage generated by the soft start circuit 20 increases with time as will be described later while the maximum voltage $V_{max}$ is a preliminarily set constant voltage. Therefore, the PWM signal $V_{pwm}$ output from the first comparator 16 is a pulse-width-modulated signal whose ON-period gradually increases with time based on the soft start voltage $V_{ss}$ when $V_{ss} < V_{max}$. When $V_{ss} > V_{max}$, the PWM signal $V_{pwm}$ becomes a pulse-modulated signal having the maximum constant duty ratio determined by the maximum voltage $V_{max}$.

The PWM signal $V_{pwm}$ output from the first comparator 16 is output to the driver circuit 14.

The driver circuit 14 generates the switching signal $V_{sw}$ based on the PWM signal $V_{pwm}$ to control the gate voltage of the MOSFET as the switching element SW1 thereby intermittently turning on/off the switching element SW1. The driver circuit 14 has the enable terminal EN and generates the switching signal $V_{sw}$ for driving the switching element SW1 for a period in which the first enable signal EN1 input to the enable terminal EN is at high level. On the other hand, the driver circuit 14 keeps the switching signal $V_{sw}$ at low level to turn off the switching element SW1, thereby stopping the switching for a period in which the first enable signal EN1 input to the enable terminal EN is at the level.

Figure 2:
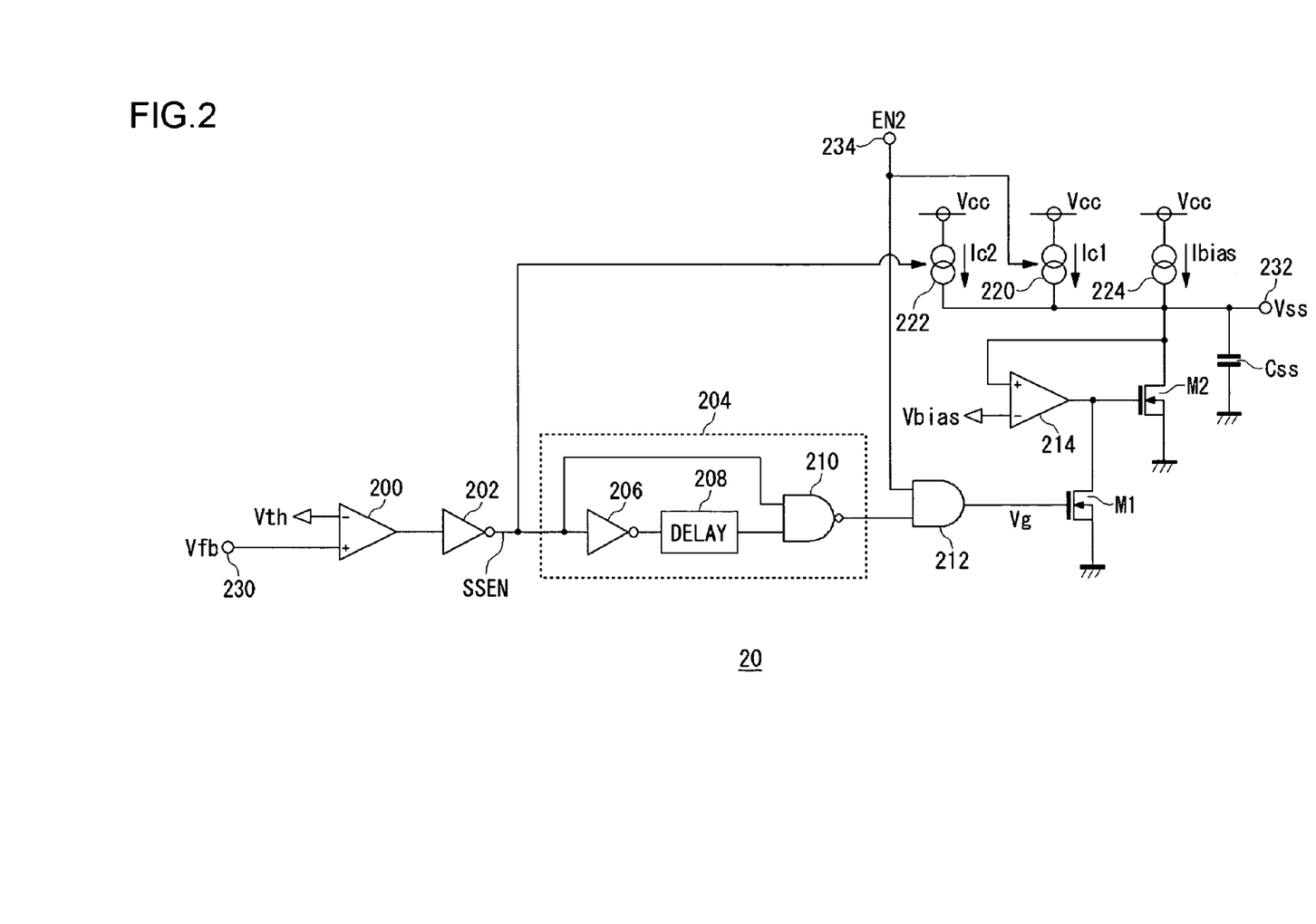
FIG. 2 is a circuit diagram showing a configuration of a soft start circuit in the embodiment.

Next, the soft start circuit 20 will be described with reference to FIG. 2. FIG. 2 is a circuit diagram showing the configuration of the soft start circuit 20 according to the embodiment.

The soft start circuit 20 generates the soft start voltage $V_{ss}$ so that the output voltage $V_{out}$ is gradually increased for a period until the output voltage $V_{out}$ of the switching power supply 100 reaches a predetermined voltage.

The soft start circuit 20 of FIG. 2 has a soft start input terminal 230 to which the feedback voltage $V_{fb}$ in FIG. 1 is input and a soft start output terminal 232 from which the generated soft start voltage $V_{ss}$ is output.

When the feedback voltage $V_{fb}$, which is obtained by increasing the output voltage $V_{out}$ in a certain ratio, is lower than a predetermined threshold $V_{th}$, the soft start circuit 20 increases the soft start voltage $V_{ss}$ so that the output voltage $V_{out}$ increases at a first limiting speed. On the other hand, when the feedback voltage $V_{fb}$ is higher than the threshold voltage $V_{th}$, the soft start voltage $V_{ss}$ is increased so that the output voltage $V_{out}$ increases at a second limiting speed which is set higher than the first limiting speed. The threshold voltage $V_{th}$ is set in a range where inrush current is not generated at the time of increasing the output voltage $V_{out}$ at the second limiting speed.

The soft start circuit 20 supplies constant current to the charge capacitor $C_{ss}$ whose one end is grounded, and outputs the voltage appearing at the charge capacitor $C_{ss}$ as the soft start voltage $V_{ss}$ from the soft start output terminal 232. The larger, the value of the constant current for charging the charge capacitor $C_{ss}$ is, the higher the rising speed of the soft start voltage $V_{ss}$ would be and the smaller the value of the constant current is, the lower the rising speed of the soft start voltage $V_{ss}$ would be.

To change the rising speed of the soft start voltage $V_{ss}$, the soft start circuit 20 has a first current source 220 and a second current source 222 as current sources for charging the charge capacitor $C_{ss}$. Each of the current sources is configured so as to turn on/off the current supply.

It is assumed that constant current generated by the first current source 220 is first constant current $I_c 1$, and constant current generated by the second current source 222 is second constant current $I_c 2$. At the time of increasing the output voltage $V_{out}$ at the first limiting speed, only the first current source 220 is turned on. At the time of increasing the output voltage $V_{out}$ at the second limiting speed, the second current source 222 is also turned on in addition to the first current source 220.

The soft start voltage $V_{ss}$ continues to be increased as the charge capacitor $C_{ss}$ is charged and reaches to a constant value when transistors in the first current source 220, the second current sources 222 and a third current source 224 are saturated to stop the current supply.

A second transistor M2, an operational amplifier 214, and the third current source 224 form a bias circuit for keeping the potential of the soft start output terminal 232, that is, the soft start voltage $V_{ss}$ not to be lower than a constant voltage $V_{bias}$. It is desirable to set the constant voltage $V_{bias}$ to be almost equal to the minimum voltage of the oscillation signal $V_{osc}$ output from the oscillator 18 in FIG. 1 for a reason to be described later. After the voltage $V_{fb}$ according to the output voltage $V_{out}$ becomes lower than the threshold voltage $V_{th}$, the bias circuit becomes active for a predetermined period to keep the voltage appearing at the charge capacitor $C_{ss}$ to a predetermined constant voltage $V_{bias}$.

The bias voltage $V_{bias}$ is applied to the inverting input terminal of the operational amplifier 214, and an output of the operational amplifier is connected to the gate terminal of the second transistor M2. The drain terminal of the second transistor M2 is fedback to the non-inverting input terminal of the operational amplifier 214. As a result, the soft start voltage $V_{ss}$ as the voltage of the drain terminal of the second transistor M2, that is, the voltage of the soft start output terminal 232 is feedback controlled so as to be close to the bias voltage $V_{bias}$ applied to the inverting input terminal. The third current source 224 is a bias current source for supplying a bias current $I_{bias}$ to operate the second transistor M2. The bias circuit may have a simple configuration without having the operational amplifier 214. In this case, a voltage, generated between the drain and the source when the bias current $I_{bias}$ flows in a state where the gate voltage of the second transistor M2 is kept constant, is set to the bias voltage $V_{bias}$.

The bias circuit is capable of being switched between the active state and the inactive state in accordance with the on/off state of the second transistor M2. The drain terminal of the first transistor M1 is connected to the gate terminal of the second transistor M2 and when the first transistor M1 is turned on, a voltage $V_g$ of the gate terminal of the second transistor M2 is kept at low level. At this time, the second transistor M2 is turned off, so that the bias circuit is switched inactive, and the bias voltage kept constant is released. When the first transistor M1 is turned off, the bias circuit is turned active.

A second comparator 200 compares the feedback voltage $V_{fb}$ input from the soft start input terminal 230 with the predetermined threshold voltage $V_{th}$, outputs a high-level signal when $V_{fb} > V_{th}$, and outputs a low-level signal when $V_{fb} < V_{th}$. The signal output from the second comparator 200 is inverted logically by an inverter 202, and the resultant signal is output to a one-shot circuit 204 and the second current source 222.

The one-shot circuit 204 has the function of detecting the edge of an input signal and continuously holding its output for predetermined time starting from the detected transition time. In the embodiment, the one-shot circuit 204 includes an inverter 206, a delay circuit 208, and a NAND circuit 210, and sets an output from the NAND circuit 210 to low level for a time period of delay time Td in the delay circuit 208 starting from the time of the leading edge of the signal input to the inverter 206.

An AND circuit 212 outputs the logical product (AND) of an output of the one-shot circuit 204 and a second enable signal EN2 applied to a second enable terminal 234. An output of the AND circuit 212 is input to a gate terminal of the first transistor M1. When the output of the AND circuit 212 is at high level, the first transistor M1 is turned on. When the output of the AND circuit 212 is at low level, the first transistor M1 is turned off.

Figure 3:
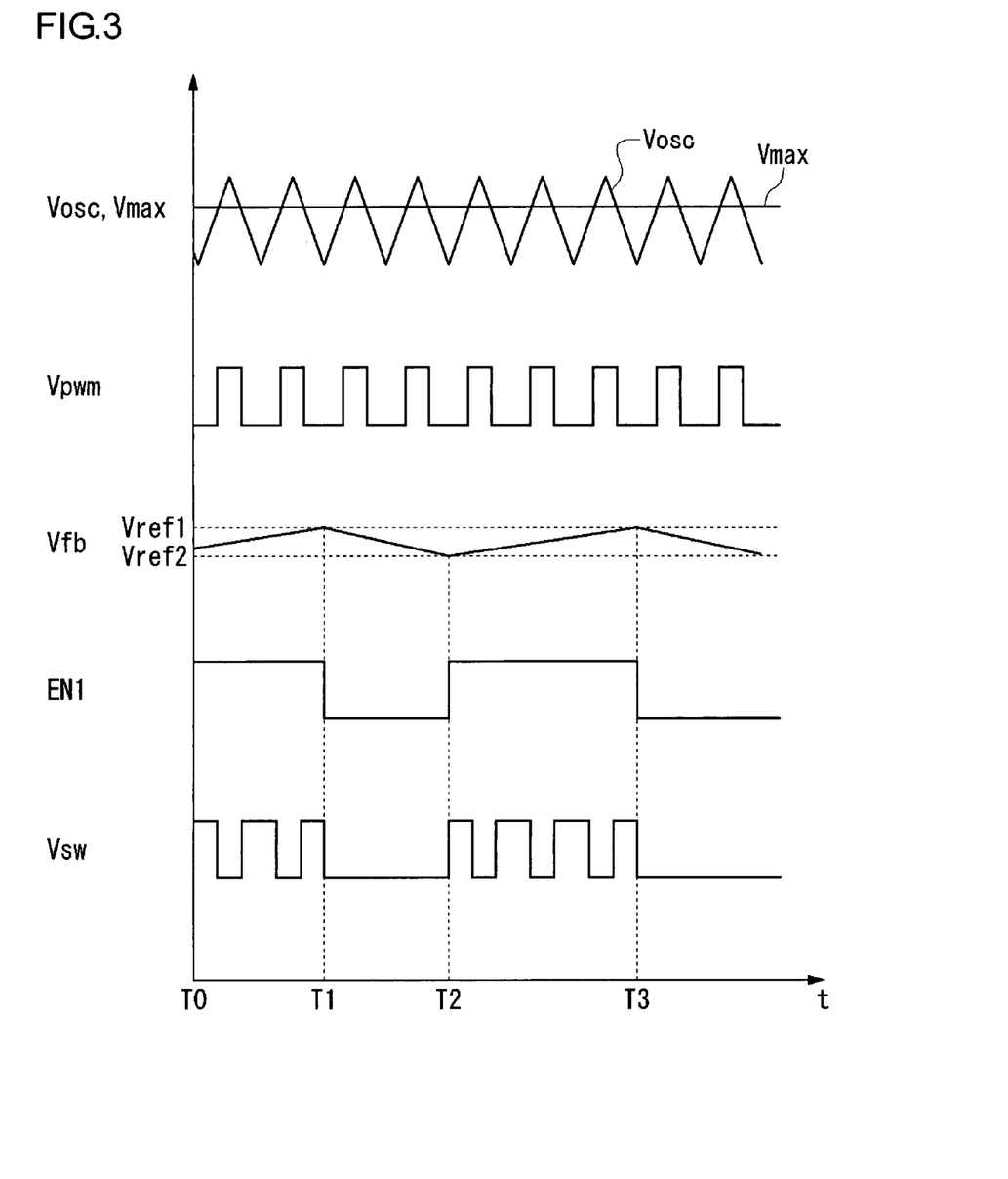
FIG. 3 is a diagram showing time waveforms of voltages of the switching power supply in a steady state.

The operation in the steady state of the switching power supply 100 having the above configuration will be described. FIG. 3 shows time waveforms of voltages of the components of the switching power supply 100 in the steady state.

In the steady state, the charge capacitor $C_{ss}$ is charged in the soft start circuit 20. Consequently, $V_{ss} > V_{max}$ is satisfied in the relation of the soft start voltage $V_{ss}$ output from the soft start output terminal 232 and the maximum voltage $V_{max}$. The first comparator 16 generates the PWM signal $V_{pwm}$ based on the maximum voltage $V_{max}$ and the oscillation signal $V_{osc}$. As a result, the PWM signal with the fixed duty ratio, that is, with constant ON-period as shown in the diagram is obtained.

For the period from time T0 to T1, $V_{out} > V_{ref}2$ is satisfied in the hysteresis comparator 22. A high-level signal is input to the enable terminal EN of the driver circuit 14, and the switching signal $V_{sw}$ is generated based on the PWM signal $V_{pwm}$.

When the feedback voltage $V_{fb}$ is increased to the reference voltage $V_{ref}1$ at time T1, an output of the hysteresis comparator 22 becomes low level, so that the driver circuit 14 stops generating the switching signal $V_{sw}$. When the on/off operation of the switching element SW1 stops, charge for the output capacitor Co1 stops in the switching power supply 100 of FIG. 1. Consequently, current flows in the load circuit 300, and thereby the output voltage $V_{out}$, that is, the feedback voltage $V_{fb}$ starts dropping.

After that, when the feedback voltage $V_{fb}$ drops to the reference voltage $V_{ref}2$ at time T2, a high-level signal is input again to the enable terminal EN in the driver circuit 14. Therefore, generation of the switching signal $V_{sw}$ starts, and the feedback voltage $V_{fb}$, that is, the output voltage $V_{out}$ starts being increased again.

In such a manner, the switching power supply 100 according to the embodiment monitors the output voltage $V_{out}$ by the hysteresis comparator 22 so that the output voltage $V_{out}$ is stable between the reference voltages $V_{ref}1$ and $V_{ref}2$.

Figure 4:
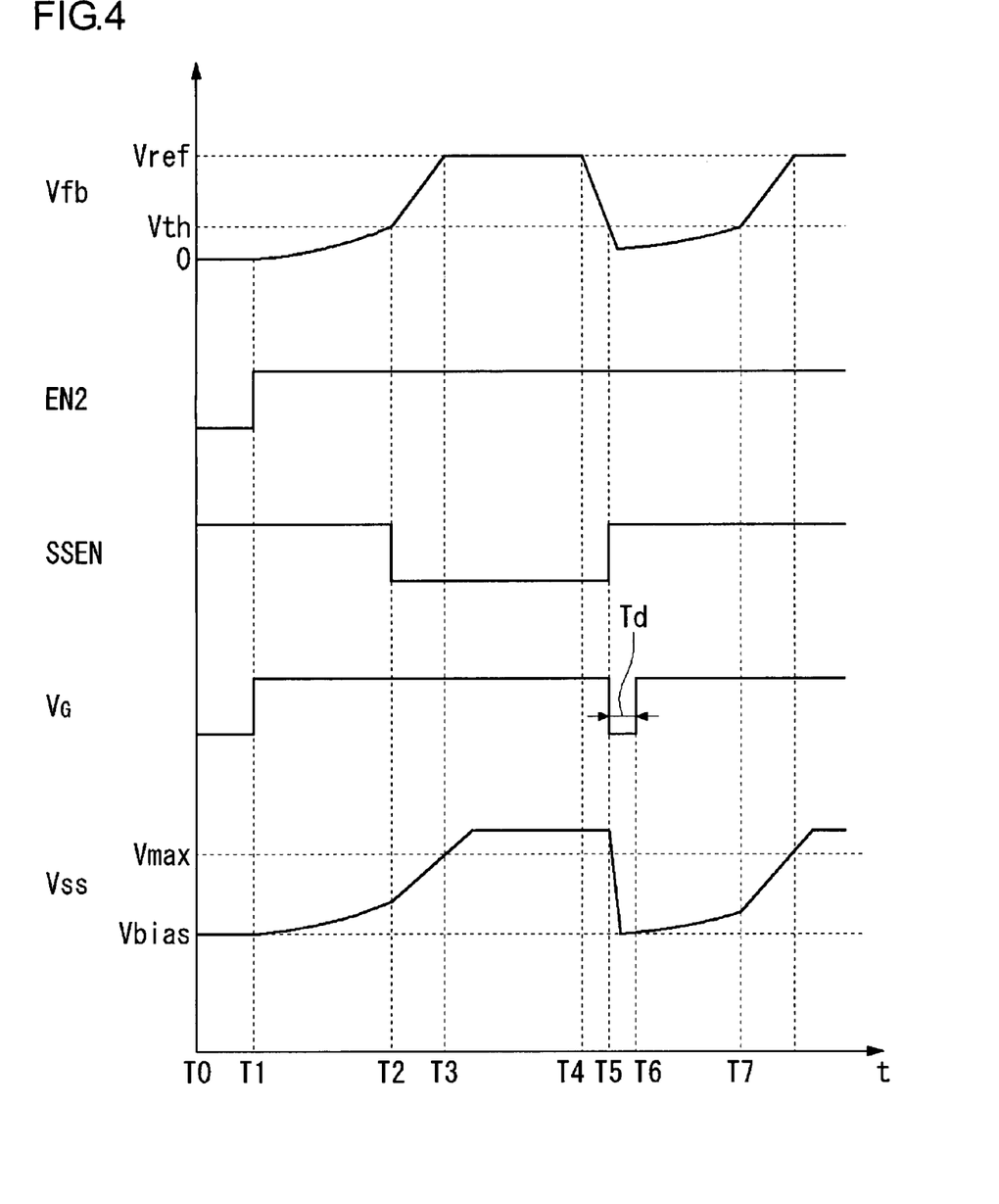
FIG. 4 is a diagram showing time waveforms of voltages of the switching power supply at the time of soft start.

Next, the operation on soft start of the switching power supply 100 will be described. FIG. 4 shows time waveforms of the components of the switching power supply 100 on soft start.

In the period from time T0 to T1, the second enable signal EN2 input to the second enable terminal 234 is at low level, so that the first current source 220 is off, and $V_{fb} < V_{th}$, so that the second current source 222 is also off. Since the second enable signal EN2 is at low level, the first transistor M1 is off, and thereby the soft start voltage $V_{ss}$ is stabilized at the bias voltage $V_{bais}$ by the bias circuit including the second transistor M2, the operational amplifier 214, and the third current source 224.

At time T1, the second enable signal EN2 input to the second enable terminal 234 is switched to high level. As a result, the first current source 220 in FIG. 2 is turned on, charging for the charge capacitor $C_{ss}$ starts, and the soft start voltage $V_{ss}$ starts to be increased. In association with the increase of the soft start voltage $V_{ss}$, the duty ratio of the PWM signal $V_{pwm}$ output from the first comparator 16 in FIG. 1 gradually increases. As a result, the ON-period of the switching element SW1 also becomes gradually longer, and the output voltage $V_{out}$, that is, the feedback voltage $V_{fb}$ starts to be gradually increased.

At time T2, the feedback voltage $V_{fb}$ is increased to the threshold voltage $V_{th}$. At this time, when $V_{fb} > V_{th}$ is satisfied in the second comparator 200, a signal SSEN obtained by inverting the output of the second comparator 200 becomes low level. When the signal SSEN becomes low level, the second current source 222 starts generating the second constant current $I_c2$.

The charge current to the charge capacitor $C_{ss}$ SS is the total of the first current $I_c1$, the second constant current $I_c2$ and the bias current $I_{bias}$, and increase of the soft start voltage $V_{ss}$ is accelerated.

When the soft start voltage $V_{ss}$ becomes larger than the maximum voltage $V_{max}$ at time T3, the PWM signal $V_{pwm}$ becomes of the constant duty, and the switching power supply 100 enters the steady state. In FIG. 4, the feedback voltage $V_{fb}$ is shown flat in the period from time T3 to T4 however, the feedback voltage $V_{fb}$ actually fluctuates between $V_{ref}1$ and $V_{ref}2$ as shown in FIG. 3.

When light emission of a xenon lamp of the load circuit 300 starts at time T4, charge in the output capacitor Co1 is rapidly discharged, so that the feedback voltage $V_{fb}$ drops. When the feedback voltage $V_{fb}$ becomes lower than the threshold voltage $V_{th}$ at time T5, the signal SSEN is switched to high level. By the switching of the signal SSEN, the output of the one-shot circuit 204 becomes low level for a predetermined period $T_d$. During the period, the gate voltage $V_g$ of the first transistor M1 becomes low level, the first transistor M1 is turned off, and the second transistor M2 is turned on. The charge in the charge capacitor $C_{ss}$ are discharged by the second transistor M2, and the soft start voltage $V_{ss}$ drops. In a state where the second transistor M2 is on, the soft start voltage $V_{ss}$ is adjusted to the bias voltage $V_{bias}$.

If the bias circuit including the second transistor M2 and the operational amplifier 214 is not provided but only the second transistor M2 is used, when the second transistor M2 is turned on, charge in the charge capacitor $C_{ss}$ is completely discharged, and the soft start voltage $V_{ss}$ drops close to 0V. In the case where the minimum voltage of the oscillation signal $V_{osc}$ as an output of the oscillator 18 is high to some extent, the duty ratio of the PWM signal is 0% for the period until the soft start voltage $V_{ss}$ reaches the minimum voltage. Therefore, the output voltage $V_{out}$ cannot be increased.

On the other hand, in the soft start circuit 20 of the embodiment, the soft start voltage $V_{ss}$ drops to the bias voltage $V_{bias}$ which is set to be almost equal to the minimum voltage of the oscillation signal $V_{osc}$ and does not drop more than the bias voltage $V_{bias}$. Therefore, after that, the PWM signal can be generated immediately and to increase the output voltage $V_{out}$.

After that, when an output of the one-shot circuit 204 becomes high level at time T6 after lapse of a predetermined period $T_d$ since the time T5, the gate voltage $V_g$ of the first transistor M1 becomes high level, and the first transistor M1 is turned on. At this time, the gate voltage of the second transistor M2 is kept at low level, the second transistor M2 is turned off, charging of the charge capacitor $C_{ss}$ starts again, and the soft start voltage $V_{ss}$ starts to be increased at the first limiting speed.

When the feedback voltage $V_{fb}$ becomes larger than the threshold voltage $V_{th}$ at time T7, the second current source 222 is turned on, speed of charging for the charge capacitor $C_{ss}$ is accelerated, and the output voltage $V_{out}$ is increased rapidly.

As described above, by the soft start circuit 20 and the switching power supply 100 of the embodiment, soft start is realized while switching the rising speed of the output voltage $V_{out}$ between two stages. Specifically, after the soft start, the output voltage $V_{out}$ is gradually increased so that inrush current is not generated in the range where the output voltage $V_{out}$ is lower than the predetermined threshold voltage $V_{th}$. After that, when the output voltage $V_{out}$ exceeds the threshold voltage $V_{th}$, the rising speed is increased, and the output voltage $V_{out}$ is increased rapidly. Thus, the stabilization time of the switching power supply 100 can be shortened.

Since the soft start circuit 20 operates each time the output voltage $V_{out}$ becomes lower than the predetermined threshold voltage, the soft start can be performed not only at the time of start but also when the output voltage $V_{out}$ drops such as when the operation of the load circuit 300 starts, when the input voltage $V_{in}$ fluctuates, and the like.

Further, in the soft start circuit 20 of the embodiment, by the bias circuit formed with the second transistor M2 and the operational amplifier 214, the soft start voltage $V_{ss}$ is controlled so as not to drop below the bias voltage $V_{bias}$ which is set to be almost equal to the minimum voltage of the oscillation signal $V_{osc}$. Consequently, the PWM signal having the duty ratio of 0% is not generated, so that the output voltage $V_{out}$ can be increased in short time.

Figure 5:
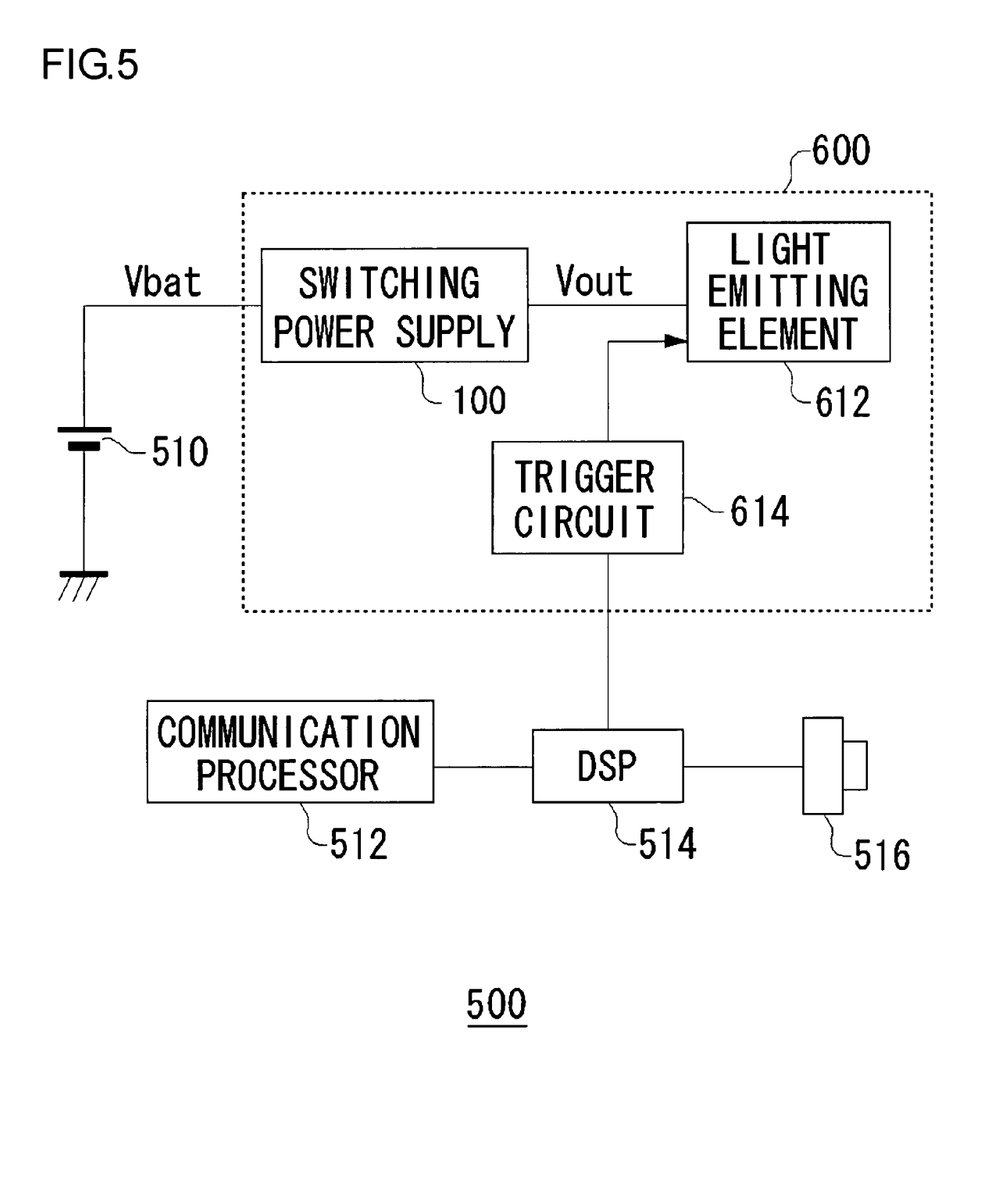
FIG. 5 is a block diagram showing a configuration of an electronic device having the switching power supply of FIG. 1.

FIG. 5 is a block diagram showing the configuration of an electronic device 500 having the switching power supply 100 of FIG. 1. For example, the electronic device 500 is a camera-mounted cellular phone terminal, and has a battery 510, a communication processor 512, a DSP (Digital Signal Processor) 514, an image pickup unit 516, and a light emitting apparatus 600. The electronic device is not limited to a cellular phone terminal but may be a PDA, digital camera, or the like.

The battery 510 is, for example, a lithium ion battery and outputs about 3V to 4V as a battery voltage $V_{bat}$. The DSP 514 is a block for integrated control of the whole electronic device 500 and is connected to the communication processor 512, the image pickup unit 516, and the light emitting apparatus 600. The communication processor 512 is a block including an antenna, an RF circuit, and the like and for performing communications with a base station.

The image pickup unit 516 is an imaging device such as a CCD (Charge Coupled Device), a CMOS sensor, or the like.

The light emitting apparatus 600 is used as a flash at the time of performing imaging by he image pickup unit 516, and has the switching power supply 100, a light emitting element 612, and a trigger circuit 614. As the light emitting element 612, a xenon tube or the like is used suitably. The switching power supply 100 increases the battery voltage $V_{bat}$ supplied from the battery 510, and supplies a drive voltage (hereinbelow, also referred to as output voltage) $V_{out}$ of about 300V to the light emitting element 612. The drive voltage $V_{out}$ is stabilized to a target voltage of a predetermined level. The trigger circuit 614 is a circuit for controlling the timing of light emission of the light emitting apparatus 600. The light emitting element 612 emits light synchronously with the imaging operation of the image pickup unit 516.

The switching power supply 100 of the embodiment can be suitably used for the light emitting apparatus 600 as shown in FIG. 5. The light emitting apparatus 600 can be mounted on an electronic device such as a cellular phone terminal. Since the starting time of the switching power supply 100 of the embodiment is shortened as described above, the light emitting element 612 can emit light without missing the timing of imaging operation.

It is understood by a person skilled in the art that the foregoing embodiment is illustrative, the combination of the components and processes can be variously modified, and the modifications are also within the scope of the present invention.

In the switching power supply 100 of the embodiment, the switching signal $V_{sw}$ of the switching element SW1 is set to have the constant duty ratio, and the driver circuit 14 is intermittently operated, thereby stabilizing the output voltage $V_{out}$. The invention, however, is not limited to the embodiment. The output voltage may be also stabilized by amplifying an error voltage between the output voltage and a target voltage and, based on the error voltage, performing pulse width modulation.

In the embodiment, the case of applying the soft start technique according to the present invention to a flyback switching regulator has been described. The technique can be also applied to a forward-type switching regulator. Further, although an insulated switching regulator using the transformer has been described as the embodiment, the switching regulator may be of a non-insulated type. The invention can be applied to wide variety of power supplies requested to increase an output voltage as promptly as possible while suppressing inrush current and unnecessary fluctuations in the output voltage.

Although the rising speed of the soft start voltage $V_{ss}$ is controlled by turning on/off the two constant current sources of the first and second current sources 220 and 222 in the soft start circuit 20 in the foregoing embodiment, the invention is not limited to the configuration. For example, it is also possible to provide only one current source and switch current values generated by the signal SSEN and the second enable signal EN2.

The settings of logic signals of high and low levels in the embodiment are an example, and the logic signals can be freely changed by appropriately being inverted by an inverter or the like.

Although the light emitting element is illustrated in FIG. 5 as a load of the switching power supply 100 of the embodiment, the load is not limited to the light emitting element. The switching power supply 100 can be suitably used for driving various load circuits operated with voltage exceeding tens V to hundreds V.

While the preferred embodiments of the present invention have been described using specific terms, such description is for illustrative purposes only, and it is to be understood that changes and variations may be made without departing from the spirit or scope of the appended claims.

What is claimed is:

1. A control circuit for controlling a switching element in a switching power supply by generating a switching signal, comprising:
   a hysteresis comparator that compares a feedback voltage determined by an output voltage of the switching power supply with a comparison voltage that makes a transition between two values in a hysteresis loop and generates a first enable signal asserted when the feedback voltage is lower than the comparison voltage;
   a soft start circuit which generates a soft start voltage that gradually increases for a period until the feedback voltage determined by the output voltage of the switching power supply reaches a predetermined reference voltage;
   a comparator that, when the soft start voltage is lower than a predetermined maximum voltage, generates a pulse width modulation signal by comparing the soft start voltage with an oscillation signal from an oscillator, and, when the soft start voltage reaches the predetermined maximum voltage, generates a pulse width modulation signal by comparing the maximum voltage with the oscillation signal; and a driver circuit that drives the switching element according to the pulse width modulation signal while the first enable signal is asserted, and stops the switching of the switching element while the first enable signal is negated, wherein the soft start circuit increases the soft start voltage at a first limiting speed when the feedback voltage is lower than a predetermined threshold voltage, and increases the soft start voltage at a second limiting speed which is set higher than the first limiting speed when the feedback voltage is higher than the threshold voltage.

2. The control circuit according to claim 1, wherein the predetermined threshold voltage is set in a range in which inrush current is not generated at the time of increasing the soft start voltage at the second limiting speed.

3. The control circuit according to claim 1, wherein the soft start circuit includes:

a charge capacitor whose one end is grounded;

a current source connected to the other end of the charge capacitor to supply constant current to the charge capacitor; and a voltage comparator which compares the feedback voltage with the threshold voltage and generates a soft start enable signal asserted when the feedback voltage is lower than the threshold voltage, wherein the value of current supplied from the current source is changed according to the soft start enable signal from the voltage comparator, and a voltage appearing at the charge capacitor is output as the soft start voltage.

4. The control circuit according to claim 3, wherein the soft start circuit further includes a bias circuit which, in an active stage keeps a voltage appearing at the charge capacitor to a predetermined voltage value, wherein the bias circuit comprises:

a transistor connected in parallel with the charge capacitor;

a bias current source that supplies a predetermined bias current source to the transistor;

an operation amplifier that adjusts a voltage at the control terminal of the transistor so that the potential at the node between charge capacitor and the bias current source matches a predetermined bias voltage, wherein when the soft start enable signal is asserted, the transistor is turned on and the bias circuit is placed in an active state for a predetermined period of time, and, subsequently, a soft start operation is started by turning the transistor off.

5. The control circuit according to claim 4, wherein the soft start circuit further comprises:

a second transistor provided between the control terminal of the transistor and the ground; and a one-shot circuit that detects the edge of the soft start enable signal and continuously holds its output for a predetermined time staffing from the detected transition time, wherein the second transistor is controlled to be turned on or off according to an output signal from the one-shot circuit and the second enable signal.

6. The control circuit according to claim 3, wherein the current source includes a first current source and a second current source and charges the charge capacitor by a current resulting from adding the currents from the two current sources, and the first current source is turned on when the second enable signal is asserted at the time of starting the switching power supply, and the second current source is turned off while the soft start enable signal is asserted and turned on while the soft start enable signal is negated.

7. The control circuit according to claim 1, wherein the control circuit is integrated on a single semiconductor substrate.

8. A switching power supply including:

the control circuit according to claim 1;

a switching element controlled by the control circuit; and an output circuit for stepping up/down an input voltage by turning on/off the switching element.

9. An electronic device comprising:

an image pickup unit;

a light emitting element which emits light as a flash at the time of imaging operation of the image pickup unit; and the switching power supply according to claim 8 which increases voltage of a battery and supplies a drive voltage to the light emitting element.

* * * * *